(12) United States Patent
Noland (10) Patent No.: US 10,582,155 B1
(45) Date of Patent: *Mar. 3, 2020

(54) VIDEO VISITATION FOR THE COGNITIVE AND/OR DEXTERITY IMPAIRED

(71) Applicant: Securus Technologies, Inc., Carrollton, TX (US)

(72) Inventor: Alexander Noland, North Richland Hills, TX (US)

(73) Assignee: Securus Technologies, Inc., Carrollton, TX (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/943,908

(22) Filed: Apr. 3, 2018

Related U.S. Application Data

(63) Continuation of application No. 15/281,549, filed on Sep. 30, 2016, now Pat. No. 9,936,161.

(51) Int. Cl.
*H04N 7/14* (2006.01)
*G06F 3/0488* (2013.01)
*H04N 7/15* (2006.01)

(52) U.S. Cl.
CPC ........... *H04N 7/147* (2013.01); *G06F 3/0488* (2013.01); *H04N 7/15* (2013.01)

(58) Field of Classification Search
CPC ......... G06F 3/0488; H04N 7/147; H04N 7/15
USPC .......................... 348/14.01–14.16; 379/37–52
See application file for complete search history.

(56) References Cited

U.S. PATENT DOCUMENTS

| | | | |
|---|---|---|---|
| 8,441,962 B1* | 5/2013 | Breau | H04L 65/1069 370/259 |
| 9,936,161 B1* | 4/2018 | Noland | G06F 3/0488 |
| 2002/0101349 A1* | 8/2002 | Rojas, Jr. | G08B 5/222 340/573.1 |
| 2004/0193449 A1* | 9/2004 | Wildman | G06Q 50/22 705/2 |
| 2005/0099493 A1 | 5/2005 | Chew | |
| 2009/0074164 A1* | 3/2009 | Cansler | H04M 1/576 379/142.06 |
| 2016/0198319 A1* | 7/2016 | Huang | H04L 67/26 455/412.2 |

* cited by examiner

*Primary Examiner* — Hemant S Patel
(74) *Attorney, Agent, or Firm* — Fogarty LLP (57) ABSTRACT

Providing video visitation with cognitive and/or dexterity impaired individuals may call for limiting functionality of a personal cognitive and/or dexterity impaired individual communication and/or media device, such as by an operating system of the personal device. The personal device may play audio and video, accept video communications in response to touching of a screen of the personal device, and establish a video communication in response to such touching of the screen. Providing the video visitation may also include receiving a request to initiate a video communication over the personal device with a cognitive and/or dexterity impaired individual, such as may be requested via a visitor communication and/or media device. Whereupon, an audible message may be played by the personal device, indicating the request, and the video communication between the personal device and the visitor device may be established in response to touching of the screen of the personal device.

20 Claims, 5 Drawing Sheets

VIDEO VISITATION FOR THE COGNITIVE AND/OR DEXTERITY IMPAIRED

CROSS-REFERENCE TO RELATED APPLICATION

This is a continuation of, and claims benefit of, U.S. patent application Ser. No. 15/281,549, also entitled Video Visitation for the Cognitive and/or Dexterity Impaired, filed Sep. 30, 2016 and issued as U.S. Pat. No. 9,936,161 on Apr. 3, 2018, which is hereby incorporated herein by reference.

TECHNICAL FIELD

The present disclosure relates generally to controlled-environment facilities, more particularly to communications by residents of controlled-environment facilities, and specifically to video visitation for cognitive and/or dexterity impaired controlled-environment facility resident individuals.

BACKGROUND

Family members and friends of skilled nursing and rehabilitation facility residents may typically be working into the later years of their life, leaving limited time in their schedules to visit the patient in-person. While video visitation with the patient may seem to be a viable answer to at least some degree, many, if not a majority of, skilled nursing facility patients do not have the ability to use video visitation software (e.g. SKYPE®, FACETIME®, or the like) due to cognitive limitations, physical impairments, a lack of technological experience, or for similar reasons. For example, such video communication programs or functionality require memorization of passwords and processes, or the like, which may be a difficultly for the elderly. Similarly, existing tablet computer-based solutions are too complex, in that required navigation of software by the patient drastically limits the skilled nursing patient's ability to use such a device. Also, operation of a computer, tablet computing device, or the like may be difficult for people with traumatic injuries resulting in limited movement. In such cases, help from another person, such as very busy facility personnel may be required to make use of such video communication programs or functionality.

SUMMARY

The present invention is directed to systems and methods which provide video visitation for cognitive and/or dexterity impaired individuals. These cognitive and/or dexterity impaired individuals may be residents of one or more controlled-environment facilities such as skilled nursing and/or rehabilitation facilities, or the like. Regardless, such systems and methods may use a personal cognitive and/or dexterity impaired individual communication and/or media device, which may be configured to limit its functionality. For example, the personal device may be limited to playing audible messages and/or video, acceptance of video communications by a touch to a screen of the personal device and establishment of video communications in response to such touching of the screen of the personal device. This personal cognitive and/or dexterity impaired individual communication and/or media device may be a wall-mounted tablet computing device, or the like.

The present systems and methods may, as a part of providing such video visitation, accept a request, via a visitor communication and/or media device, to initiate a video communication with a cognitive and/or dexterity impaired individual on the personal cognitive and/or dexterity impaired individual communication and/or media device. As a result, an audible message indicating the request may be played on the individual's personal device. This audible message may be instructions to the cognitive and/or dexterity impaired individual to touch the screen of the personal device to accept the video communication. The audible message may be provided by the visitor, via the visitor device. The personal device may additionally (or alternatively) be configured to present a text message on the personal device screen, indicating the request, identifying the visitor, and/or the like. Additionally or alternatively, the personal device may be configured to present an image or video of the visitor on the screen, such as concurrent with playing the audible message indicating the request.

Regardless, in accordance with the present systems and methods, a video communication between the personal device and the visitor device is established in response to touching of the screen of the personal device (by the cognitive and/or dexterity impaired individual).

In some implementations, the personal cognitive and/or dexterity impaired individual communication and/or media device may also be configured to enable a professional caregiver, such as a physician, or the like to initiate a push a notification to a primary responsible caregiver party to open a visitor video visitation application program, access a visitor video visitation website, or the like, to make a request to initiate a video communication. To this end, the personal communication and/or media device may be configured to accept a combination of taps on its screen and/or a combination of one or more button presses to initiate the push notification.

Where the cognitive and/or dexterity impaired individual is a resident of a controlled-environment facility, the present systems and methods may further employ a controlled-environment facility communications processing system. This controlled-environment facility communications processing system may be configured to accept the request to initiate the video communication, direct the audible message indicating the request to the personal device, and at least facilitate establishing the video communication between the personal device and the visitor device, in, as mentioned above, response to touching of the screen of the personal device (by the cognitive and/or dexterity impaired individual).

The personal device may also be configured to display images from an album associated with the cognitive and/or dexterity impaired individual on the screen of the personal device, such as when the personal device is not in use for video communications or acceptance of video communications. Images for the album may be provided via the aforementioned visitor communication and/or media device.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including", but not limited to.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include healthcare facilities (e.g., hospitals, nursing homes, mental health facilities, rehabilitation facilities, such as drug and alcohol rehabilitation facilities, etc.), correctional institutions (e.g., municipal jails, county jails, state prisons, federal prisons, military stockades, juvenile facilities, detention camps, home incarceration environments, etc.), restricted living quarters (e.g., hotels, resorts, camps, dormitories, barracks, etc.), and/or the like. For convenience of explanation, various examples discussed herein are presented in the context of a skilled nursing facility (colloquially referred to as a "nursing home"), or the like. For instance, in some of the embodiments discussed below, a controlled-environment facility may be referred to as a skilled nursing facility, or the like, and its residents may be referred to as patients, or the like. It should be understood, however, that the systems and methods described herein may be similarly applicable to other types of controlled-environment facilities and their respective residents (e.g., a hospital and its patients, a school dormitory and its students, a correctional institution and its inmates, etc.).

The present systems and methods relate generally to controlled-environment facilities, more particularly to communications by residents of controlled-environment facilities, and specifically to video visitation for cognitive and/or dexterity impaired controlled-environment facility residents, such as residents of a skilled nursing facility. In accordance with embodiments of the present systems and methods, video visitation with cognitive and/or dexterity impaired individuals may call for limiting functionality of a personal cognitive and/or dexterity impaired individual communication and/or media device, such as by an operating system of the personal device. The personal device may play audio and video, accept video communications in response to touching of a screen of the personal device, and establish a video communication in response to such touching of the screen. To provide such video visitation a request to initiate a video communication using the personal device with a cognitive and/or dexterity impaired individual may be requested, for example via a visitor communication and/or media device. Whereupon, an audible message may be played by the personal device, indicating the request, and the video communication between the personal device and the visitor device may be established in response to the touching of the screen of the personal device (such as touching of the screen by the cognitive and/or dexterity impaired individual, a professional caregiver that is present, or the like). Hence, embodiments of the present systems and methods may be tablet computer-based, but may strip functionality of the tablet down to just one-touch functionality for acceptance of a video visit. Thereby, a tablet employed in conjunction with embodiments of the present systems and methods may serve one function only, accepting a video call just by touching the screen.

Figure 1:
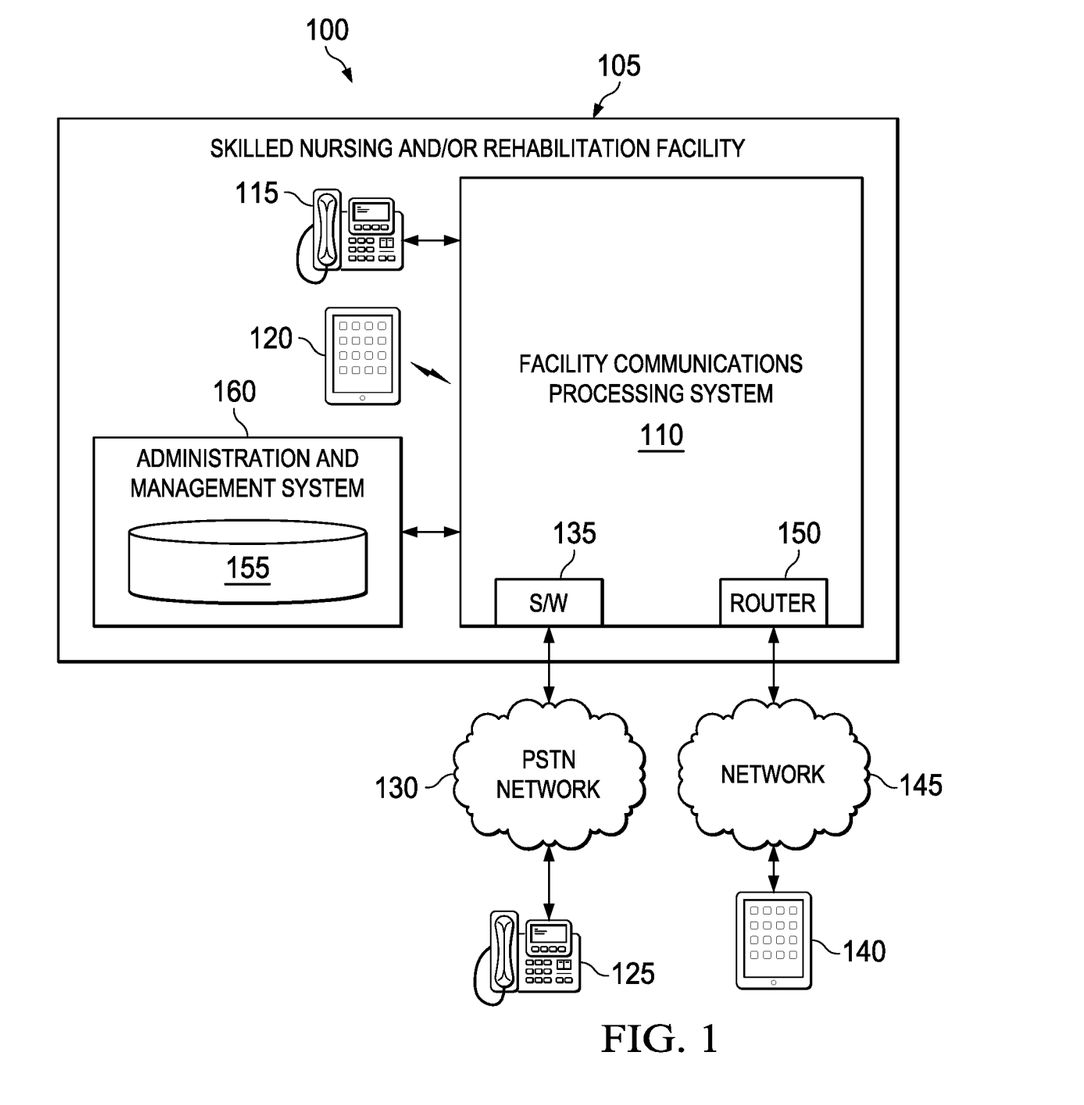
FIG. 1 is a diagrammatic illustration of an example communications environment, wherein an example embodiment of the present systems and methods for video visitation for cognitive and/or dexterity impaired controlled-environment facility resident individuals may be deployed in conjunction with a skilled nursing and/or rehabilitation facility, according to some embodiments.

FIG. 1 is a diagrammatic illustration of example communications environment 100, wherein an example embodiment of the present systems and methods for video visitation for cognitive and/or dexterity impaired individuals may be deployed in conjunction with a controlled-environment facility, such as skilled nursing and/or rehabilitation facility 105, a hospital, or the like, in accordance with some embodiments. Therein, communications processing system 110 may provide telephone services, videoconferencing, online chat, and other communication services to individual residents of skilled nursing and/or rehabilitation facility 105. In some cases, such as illustrated, communications processing system 110 may be co-located with skilled nursing and/or rehabilitation facility 105. Alternatively, communications processing system 110 may be centrally and/or remotely located with respect to one or more controlled-environment facilities and/or may provide communication services to multiple controlled-environment facilities, including any number of skilled nursing and/or rehabilitation facilities, hospitals, or the like. More generally, however, it should be noted that communications processing system 110 may assume a variety of forms, and may be configured to serve a variety of facilities and/or users, whether within or outside of a controlled-environment facility, such as skilled nursing and/or rehabilitation facility 105.

Resident patients may use more-or-less conventional telephones 115 to access certain communication services. Traditionally, resident or facility telephone 115 may be capable of connecting to a non-resident's (i.e., a friend or family member of the resident of skilled nursing and/or rehabilitation facility 105) telephone 125 across a Publicly Switched Telephone Network (PSTN) 130, in some cases under control of communication processing system 110. For example, telephone 125 may be located at a non-resident's home or office. Switch 135 (in communication processing system 110) may be used to connect calls across PSTN 130. Additionally or alternatively, the non-resident may communicate using device 140, which may be a mobile phone, tablet computing device, personal computer, or the like, which may be connected through an Integrated Services Digital Network (ISDN), Voice-over-IP (VoIP), packet data network (such as, for example the Internet), a wireless communications network, or the like 145. Router 150 of communication processing system 110 is used to route data packets associated with a call connection to device 140. For example, a non-resident party may have a device 140 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications, VOIP, or video communications, such as SKYPE®, FACETIME®, or the like. Additionally or alternatively, the correctional facility and/or the destination may use videoconferencing equipment compatible with ITU H.323, H.320, H.264, and/or V.80, or other suitable standards.

In addition to providing certain visitation and communication operations, communication processing system 110 may attempt to ensure that a resident's calls, video conferences, online chats, etc. are performed only with non-residents whose identities, devices, email addresses, phone numbers, etc. are approved for communication with the resident. A list of visitors approved for the resident may be stored, for example, in database 155 maintained by controlled-environment Administration and Management System (AMS) 160. In addition to such approved visor lists, AMS 160 may also store Resident Profile Data (RPD), as well as communication and/or visitation rules applicable to each resident. As noted, in some embodiments, communication processing system 110 may be located remotely with respect to skilled nursing and/or rehabilitation facility 105, and access to AMS 160 may be obtained via a computer network such as, for example, network 145.

In accordance with embodiments of the present systems and methods, residents may also use controlled-environment resident communication and/or media device 120, or the like, for communications, including video communications. In accordance with embodiments of the present systems and methods, device 120 may be a wireless typically mobile device, such as a tablet computing device or the like, which may have been adapted and/or approved for use in a skilled nursing and/or rehabilitation facility. Such a personal resident device may be referred to as an Intelligent Resident Device (IRD), or the like, in controlled-environment facilities in general and/or referred to herein as a personal cognitive and/or dexterity impaired individual communication and/or media device (120), or the like, particularly as adapted in accordance with the present systems and methods. As will be appreciated, personal communication and/or media device 120 has video conferencing capabilities, or the like, to enable a party to participate in video communication sessions with other call parties, such as non-residents of the skilled nursing and/or rehabilitation facility (i.e. resident family or friends), generally referred to herein as "visitors," via video communication.

In various embodiments, personal cognitive and/or dexterity impaired individual communication and/or media devices 120 may be tablet computing devices, smartphones, media players, or the like adapted and/or approved for use by residents of the skilled nursing and/or rehabilitation facility. Each personal communication and/or media device 120 may be particularly adapted for use in a controlled-environment and particularly for use by a cognitive and/or dexterity impaired person to accept initiation of a video communication. For example, in a skilled nursing and/or rehabilitation environment such a personal communication and/or media device, or IRD, may have a specially adapted operating system and/or may be "stripped-down," particularly from the standpoint of what application programs (apps) and/or hardware are provided or enabled on personal communication and/or media device 120, and/or connectivity afforded such a personal communication and/or media device. For example, such a personal communication and/or media device may employ an operating system kernel built for use in such a personal communication and/or media device in a skilled nursing and/or rehabilitation facility, hospital or other similar controlled-environment. As a further example, the personal communication and/or media device may be adapted to only connect to a network provided by the skilled nursing and/or rehabilitation facility, and/or in only certain locations, within the skilled nursing and/or rehabilitation facility, such as may be controlled by availability of Wi-Fi access, or the like, only being available in certain areas. That is, for example, the personal communication and/or media device of a particular resident may be adapted to only access wireless communications in the resident's room, or the like. This may be accomplished by leveraging the structure of the skilled nursing and/or rehabilitation facility, for example, limiting the availability of a Wi-Fi signal, providing the video visitation through the placement of wireless access points, antenna directionality of such wireless access points, and/or the like. Further, the personal communication and/or media device may only allow access to a video visitation/communication app. Additionally, the personal communication and/or media device may only allow such access upon application of security measures, such as, biometric validation (e.g. resident fingerprint or facial recognition). As noted, the personal communication and/or media device may have one, or only a few fixed apps pre-installed, and installation of further apps on the device may be forbidden (i.e. prevented by modifications to the device's operating system, or the like). One app that may be provided on personal communication and/or media devices beyond the video visitation/communication app might be a screen saver-type app or other similar functionality included in the device operating system, which may display images from a photo album, or the like, when device is not in use for video communication and/or acceptance of such communications.

In accordance with embodiments of the present systems and methods, such personal communication and/or media devices may be owned or otherwise provided in accordance with specifications outlined by the controlled-environment facility (i.e. the skilled nursing and/or rehabilitation facility, hospital, or the like) in which the device is to be used and the resident housed. A resident family member, or other responsible party may subscribe to, or for use of, the personal communication and/or media device by the resident and the responsible party for video visitations, while other visitors may also subscribe for use of the device for video visitations or may pay for such video visitations on a per-use basis.

However, as noted, many, if not a majority of, skilled nursing facility patients do not have the ability to use video visitation software (e.g. SKYPE®, FACETIME®, or the like) due to cognitive limitations, physical impairments, a lack of technological experience, or for similar reasons. For example, such video communication programs or functionality require memorization of passwords and processes, or the like. This is very difficult for the elderly and most of the time requires help from another person, such as very busy facility personnel. Similarly, existing tablet computer-based solutions are too complex, in that required navigation of software by the patient drastically limits the skilled nursing patient's ability to use such a device.

Figure 2:
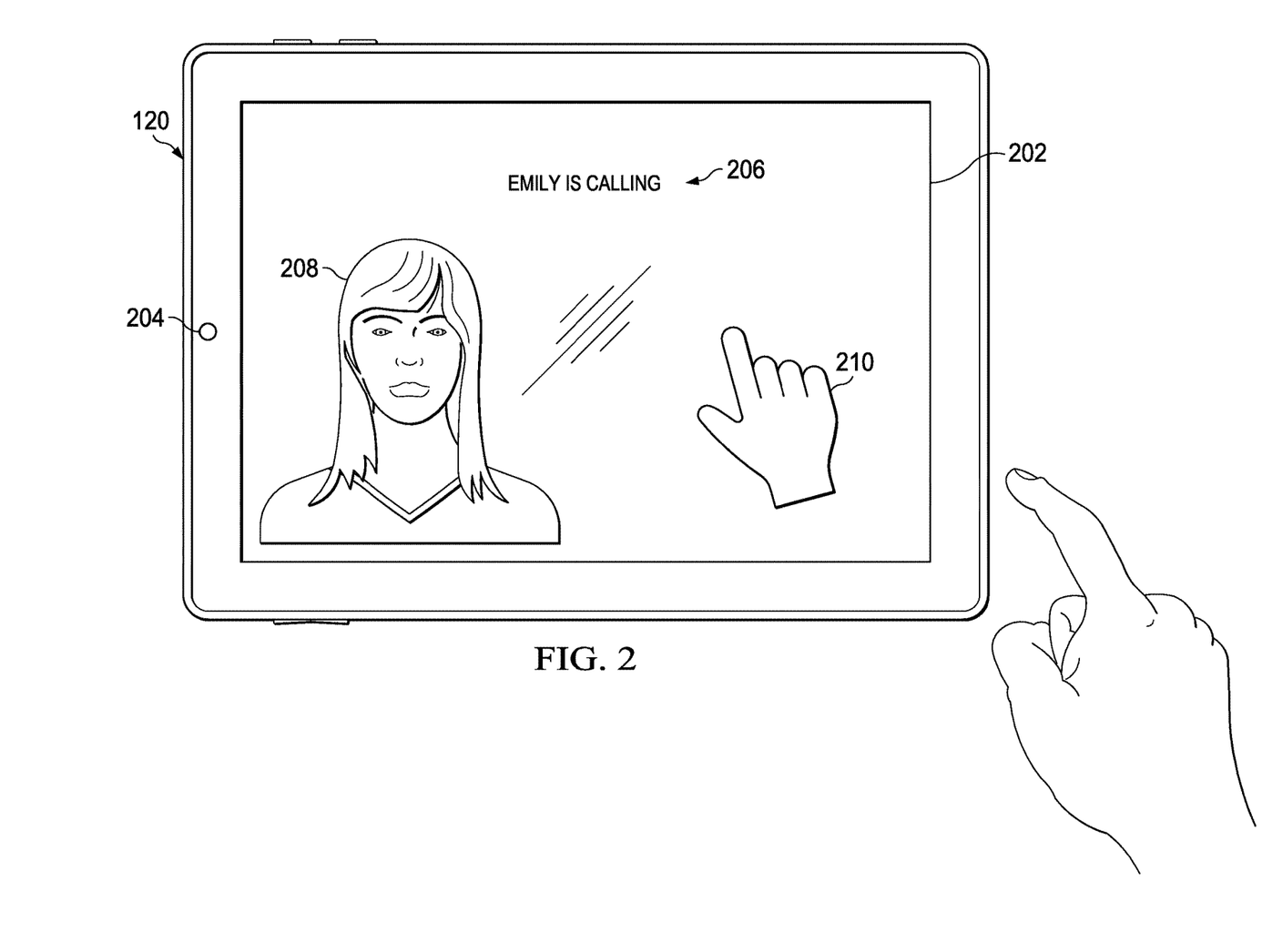
FIG. 2 is a diagrammatic illustration of a personal cognitive and/or dexterity impaired individual communication and/or media device configured in accordance with some embodiments of the present systems and methods.

FIG. 2 is a diagrammatic illustration of skilled nursing and/or rehabilitation facility resident communications and/or media device (personal cognitive and/or dexterity impaired individual communication and/or media device) 120, configured in accordance with some embodiments of the present systems and methods. Personal media device 120 may, as noted above be a tablet computing device, which may be wall-mounted to help insure it remains accessible and to facilitate keeping the device charged via an attached charger, or the like. In accordance with embodiments of the present systems and methods, personal device 120 may have a personal cognitive and/or dexterity impaired individual communication and/or media device operating system, which may, in accordance with embodiments of the present systems and methods, limit various functions of the device. For example, functions of touch screen 202 may be limited and/or buttons, such as home button 204 may be generally eliminated altogether. Device 120 may be limited, in accordance with various embodiment, to only play either prerecorded or live audible messages and video, accept initiation of video communications by touching of screen 202, establishment of video communications in response to such touching of the screen, and/or the like.

In furtherance of various embodiments of the present systems and methods, controlled-environment facility communications processing system 110 may be configured, to accept a request, via a visitor communication and/or media device 140 to initiate a video communication with a resident of the facility via the resident's personal communication and/or media device 120. Alternatively, in accordance with other embodiments, such a request may be directed directly to the resident device, such as via a wireless communications network, or in a similar manner.

Controlled-environment facility communications processing system 110 may direct an audible message to controlled-environment facility resident communication and/or media device 120 indicating the request. In alternative embodiments resident device 120 may issue such an audible message in response to the request whether made directly to the device or through controlled-environment facility communications processing system 110. This audible message may include instructions to the resident to touch the screen of resident device 120 to accept, or otherwise complete initiation and establishment the video communication. The audible message may be provided by the visitor, via a video visitation app, video visitation web page, or the like running or otherwise presented on visitor communication and/or media device 140. Similarly, the photo album, or at least images therefor, that may be displayed when device 120 is not in use for video communication and/or acceptance of such communications may also be provided via the visitor communication and/or media device, such as through the visitor video visitation app or website. In addition to, or in place of the audible message, text message 206 and/or visitor image 208, may be presented on resident device screen 202, by controlled-environment facility communications processing system 110, and/or device 120 itself. Thereby, text message 206 and/or visitor image 208 may identify the visitor and may be presented concurrent with the audible message. Similarly, some embodiments may call for a stream of the visitor's audio and video for the visitor to aid the patient with the alert that there is an incoming visit. Additionally, a visual indicator to touch the screen (such as illustrated hand 210) may be shown on screen 202. This indicator may be animated to indicate a screen-touching action Controlled-environment facility communications processing system 110, and/or personal device 120 itself, may, in response to touching of the screen of the personal device (by the resident) establish a video communication link between personal communication and/or media device 120 and visitor communication and/or media device 140.

Figure 3:
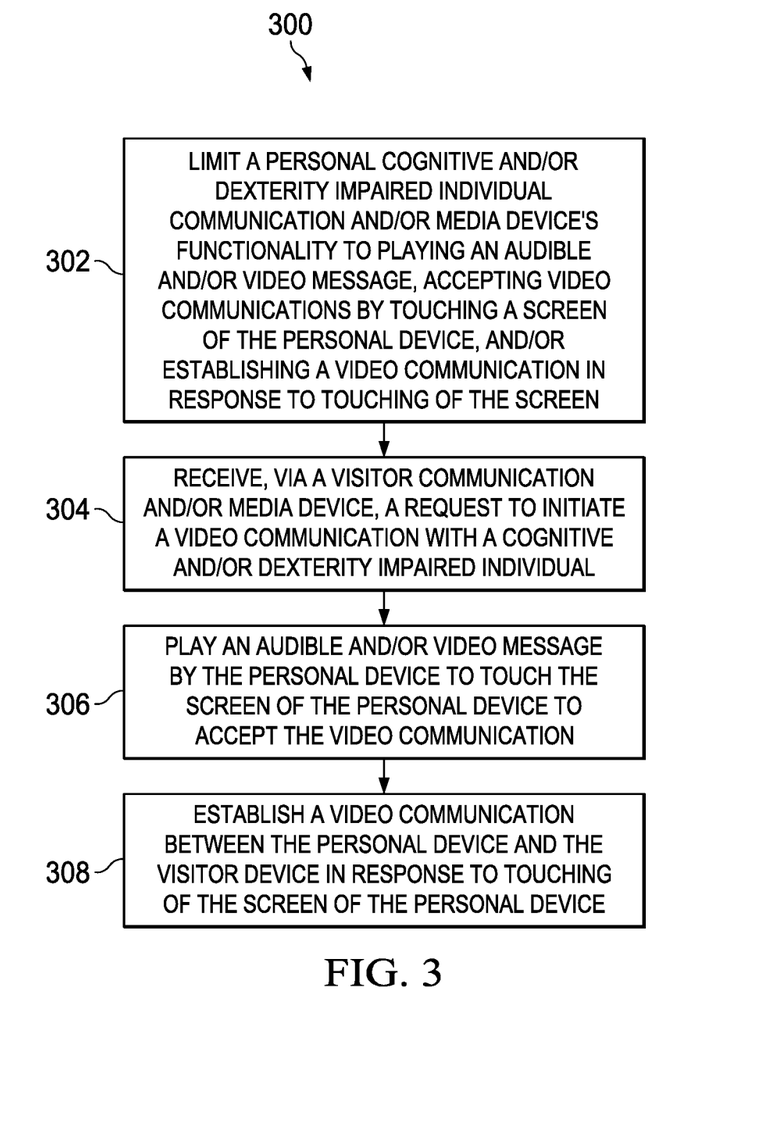
FIG. 3 is a flowchart of an example process for providing video visitation to cognitive and/or dexterity impaired individuals, in accordance with some embodiments.

FIG. 3 is a flowchart of example process 300 for providing video visitation to cognitive and/or dexterity impaired skilled nursing and/or rehabilitation facility residents, in accordance with some embodiments. Therein, an operating system, or similarly functionality of a skilled nursing and/or rehabilitation facility resident communication and/or media device, which is adapted for providing video visitation to cognitive and/or dexterity impaired residents, such as personal cognitive and/or dexterity impaired individual communication and/or media device 120, limits functionality, such as touch screen and/or button functions of the personal communication and/or media device (120) at 302. The functions the resident device may be allowed to continue to use may include playing audible messages and video in accordance with the present systems and methods, accepting video communications by touching a screen of the device in accordance with the present systems and methods, and establishing a video communication in accordance with the present systems and methods and in response to touching of the screen. The device may also be allowed to display images, such as from a digital photo album associated with the resident individual, on the screen of the device when the device is not in use for video communications or in use for acceptance of such video communications. This album, or at least the contents of this album may be managed by family members, a friend or such. To this end, the images may be provided by one or more visitors, via the visitor communication and/or media devices and apps.

At 304 a request may be received from a visitor to initiate a video communication with the resident of the skilled nursing and/or rehabilitation facility on the resident's communication and/or media device. This request may be made via a visitor communication and/or media device, such as through an app. This request may be directed to a skilled nursing and/or rehabilitation facility communications processing system in accordance with some embodiments. However, in accordance with other embodiments the request at 304 may, be passed directly to the resident's communication and/or media device, such as via a wireless communications network, for processing.

The resident's device plays an audible and/or video message at 306, indicating the video communication request. This audible and/or video message may be directed from the skilled nursing and/or rehabilitation facility communications processing system (110) to the device in accordance with some embodiments, and in other embodiments may initiate from the visitor's device (140) and/or the resident's device (120), itself. This audible and/or video message may be, in accordance with various embodiments of the present systems and methods, instructions to the resident to touch the screen (202) of the resident's device to accept, or otherwise initiate or complete establishment of the video communication with the visitor. As noted, the audible and/or video message at 306 may be provided by the visitor, via the visitor communication and/or media device, or may be a prerecorded message provided by the device or facility communications processing system, which may identify the visitor. Rather than an audible message, or in addition to the audible message, a text message (206), which may identify the visitor, may be presented on the screen of the resident communication and/or media device at 306 to indicate the video communication request. Additionally, such an audible and/or text message may be concurrently accompanied by an image (208) of the calling visitor. The message (and the aforementioned indicator (210)) may persist until the screen is touched or until the visitor terminates the visitation attempt or until a pre-configurable time limit is reached.

At 308 a video communication between resident's communication and/or media device and the visitor communication and/or media device is established in response to touching of the screen of the resident's communication and/or media device. In accordance with certain embodiments touch screen functionality may be disabled during the visit. Volume for the personal device may be controlled by the visitor during the visit, such as via the app or website on the visitor's device (140). Additionally or alternatively, a button (such as home button 204) may be enabled during a visit for the resident to toggle the volume between a loud and standard setting. In sill further or alternative embodiments, the touch screen may provide limited (localized) functionality to provide such volume toggling to the resident. The visit may, in accordance with various embodiments only be terminated by the visitor, such as via the app or web site.

Figure 4:
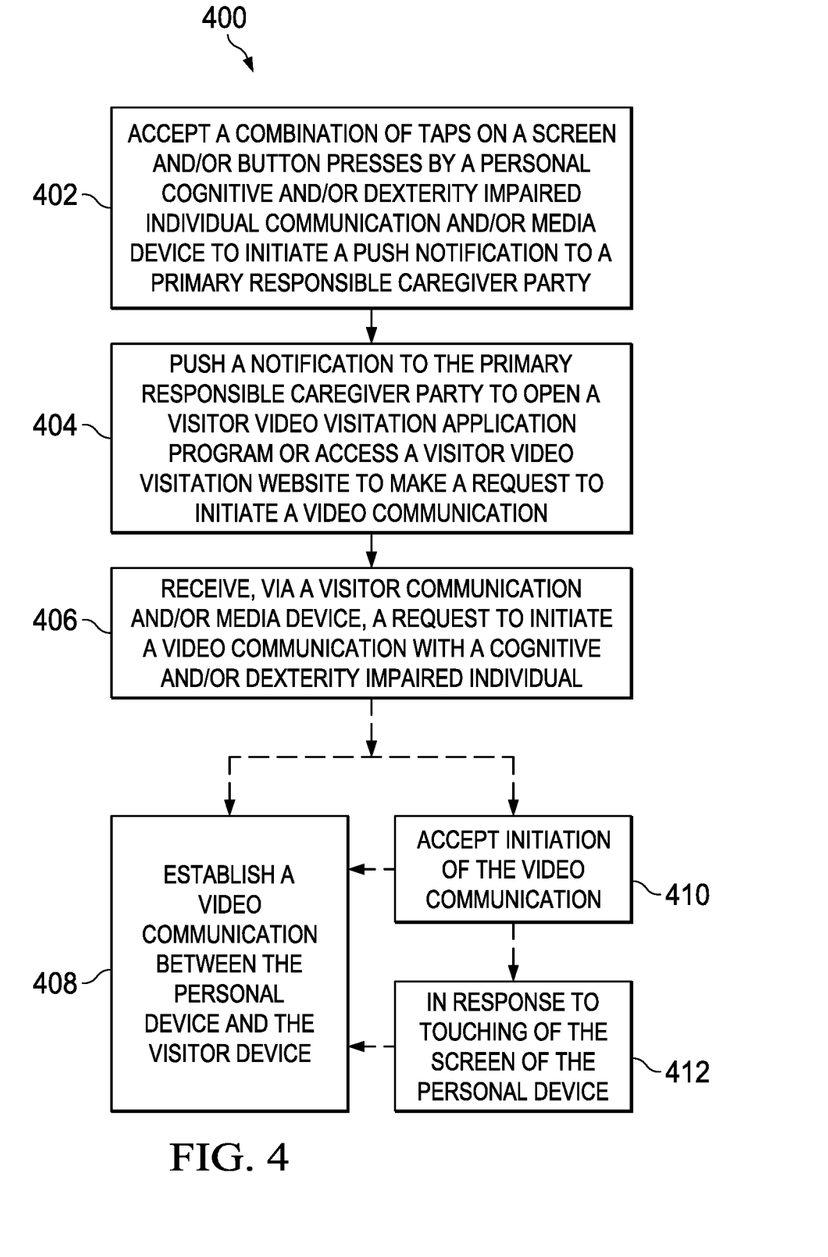
FIG. 4 is a flowchart of an example process for providing video visitation related to or involving a cognitive and/or dexterity impaired individual, between caregivers of the individual, in accordance with some embodiments.

FIG. 4 is a flowchart of example process 400 for providing video visitation related to or involving a cognitive and/or dexterity impaired skilled nursing and/or rehabilitation facility resident individuals, between caregivers of the resident and the resident, in accordance with some embodiments. In accordance with embodiments of the present systems and methods the personal cognitive and/or dexterity impaired individual communication and/or media device of the resident may be configured to allow a physician, or other professional caregiver of the resident to initiate a video conference, in which the resident, a primary responsible caregiver party (e.g. a family member of the resident responsible for the resident's care) and the professional caregiver my take part, from the resident's room. In this regard the personal device may be configured to enable the professional care giver to tap a predetermined combination on the screen (202), (home) button (204), and/or the like of the resident's device, at 402 to initiate pushing a notification to the resident's, a primary responsible caregiver, or the like, requesting the primary responsible caregiver initiate a video visitation.

At 404 a notification is pushed, emailed or otherwise sent (such as by or through a controlled-environment facility communications processing system (110)) to the primary responsible caregiver party to open a visitor video visitation app, access a visitor video visitation website, or the like to take part in a video conference related to or involving the resident, between caregivers of the resident and the resident, such as by initiating a video visitation at 406.

A video connection is established at 408 between the resident communication and/or media device (120) and a visitor communication and/or media device (140) in response to the primary responsible caregiver party (or other party) launching the visitor video visitation app, accessing the visitor video visitation website (in response to the push notification) (i.e. without the visitor necessarily requesting the video visitation (at 406)). Alternatively, the video connection may be established at 408 in response to initiating the video visitation at 406 and the professional caregiver or the resident accepting the initiation of the visitation at 410, such as by touching the screen of the resident device in response to an audible and/or visual prompt at 412.

Figure 5:
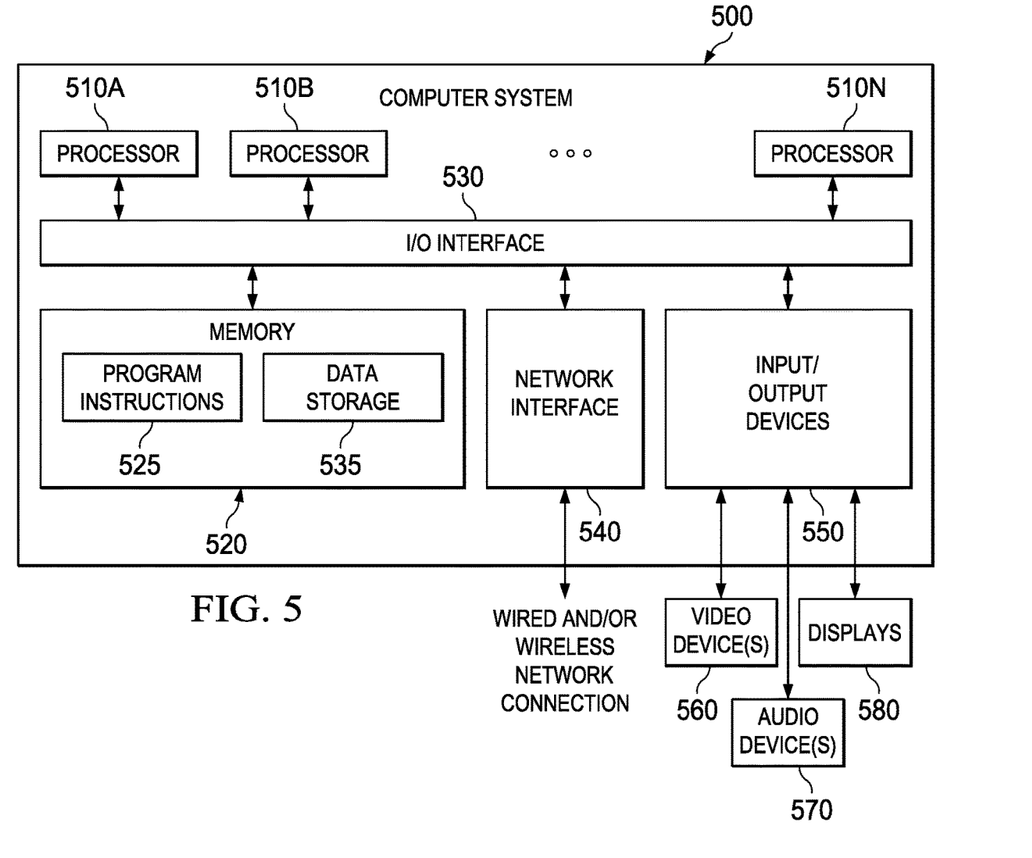
FIG. 5 is a block diagram of a computer system, device, station, or terminal configured to implement various techniques disclosed herein, according to some embodiments.

Embodiments of the present systems and methods for video visitation for cognitive and/or dexterity impaired individuals, as described herein, may be implemented or executed, at least in part, by one or more computer systems. One such computer system is illustrated in FIG. 5. In various embodiments, computer system 500 may be a server, a mainframe computer system, a workstation, a network computer, a desktop computer, a laptop, a tablet computing device, media player, or the like. For example, in some cases, computer 500 may implement one or more steps of example processes 300 and/or 400 described above with respect to FIGS. 1 through 4, and/or a computer system such as computer system 500 may be used as, or as part of, one or more of facility communications processing system 110, personal cognitive and/or dexterity impaired individual communication and/or media device 125, visitor device 140, controlled environment facility management system 160, and/or the like. In various embodiments two or more of these computer systems may be configured to communicate with each other in any suitable way, such as, for example, via a network.

As illustrated, example computer system 500 includes one or more processors 510 coupled to a system memory 520 via an input/output (I/O) interface 530. Example computer system 500 further includes a network interface 540 coupled to I/O interface 530, and one or more input/output devices 550, such as video device(s) 560 (e.g., a camera), audio device(s) 570 (e.g., a microphone and/or a speaker), and display(s) 580. Computer system 500 may also include a cursor control device (e.g., a mouse or touchpad), a keyboard, etc. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In various embodiments, computer system 500 may be a single-processor system including one processor 510, or a multi-processor system including two or more processors 510 (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or other dedicated graphics-rendering device.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 4, above, may be stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-readable medium may include any tangible or non-transitory storage media or memory media such as magnetic or optical media—e.g., disk or CD/DVD-ROM coupled to computer system 500 via I/O interface 530, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 540.

In some embodiments, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any suitable protocol, timing or other data transformations to convert data signals from one component (e.g., system memory 520) into a format usable by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments, some or all of the functionality of I/O interface 530, such as an interface to system memory 520, may be incorporated into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 5, memory 520 may include program instructions 525, configured to implement certain embodiments described herein, and data storage 535, comprising various data accessible by program instructions 525. In an embodiment, program instructions 525 may include software elements corresponding to one or more of the various embodiments illustrated in the above figures. For example, program instructions 525 may be implemented in various embodiments using any desired programming language, scripting language, or combination of programming languages and/or scripting languages (e.g., C, C++, C#, JAVA®, JAVASCRIPT®, PERL®, etc.). Data storage 535 may include data that may be used in these embodiments. In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A video visitation system for a cognitive and/or dexterity impaired individual comprising:
   a personal cognitive and/or dexterity impaired individual communication and media device configured to:
      limit functionality of the personal cognitive and/or dexterity impaired individual communication and media device available to a cognitive and/or dexterity impaired individual to:
   play audible messages and/or video;
   acceptance of video communications by any touch to a screen of the personal cognitive and/or dexterity impaired individual communication and media device; and
   establishment of video communications in response to any touching of the screen of the personal cognitive and/or dexterity impaired individual communication and media device;
accept a request, via a visitor communication and/or media device, to initiate a video communication with a cognitive and/or dexterity impaired individual on the personal cognitive and/or dexterity impaired individual communication and media device;
play an audible message indicating the request on the personal cognitive and/or dexterity impaired individual communication and media device of the individual; and
establish a video communication between the personal cognitive and/or dexterity impaired individual communication and media device and the visitor communication and/or media device in response to any touching of the screen of the personal cognitive and/or dexterity impaired individual communication and media device.

2. The system of claim 1, wherein the cognitive and/or dexterity impaired individual is a resident of a controlled-environment facility.

3. The system of claim 2, wherein the controlled-environment facility is a skilled nursing and/or rehabilitation facility.

4. The system of claim 1, wherein the personal cognitive and/or dexterity impaired individual communication and media device is a wall-mounted tablet computing device.

5. The system of claim 1, wherein the audible message is instructions to the cognitive and/or dexterity impaired individual to touch the screen of the personal cognitive and/or dexterity impaired individual communication and media device to accept the video communication.

6. The system of claim 5, wherein the audible message is provided by the visitor, via the visitor communication and/or media device.

7. The system of claim 1, wherein the personal cognitive and/or dexterity impaired individual communication and media device is further configured to present a text message on the personal cognitive and/or dexterity impaired individual communication and media device screen indicating the request.

8. The system of claim 7, wherein the text message identifies the visitor.

9. The system of claim 1, wherein the personal cognitive and/or dexterity impaired individual communication and media device is further configured to present an image or video of the visitor on the screen concurrent with playing the audible message indicating the request.

10. The system of claim 1, wherein the cognitive and/or dexterity impaired individual is a resident of a controlled-environment facility and the system further comprises:
   a controlled-environment facility communications processing system configured to:
      accept the request to initiate the video communication;
      direct the audible message indicating the request to the personal cognitive and/or dexterity impaired individual communication and media device; and
      establish the video communication between the personal cognitive and/or dexterity impaired individual communication and media device and the visitor communication and/or media device in response to any touching of the screen of the personal cognitive and/or dexterity impaired individual communication and media device.

11. A method for video visitation with cognitive and/or dexterity impaired individuals comprising:
   limiting, by an operating system of a personal cognitive and/or dexterity impaired individual communication and media device, functionality of the personal cognitive and/or dexterity impaired individual communication and media device available to a cognitive and/or dexterity impaired individual to:
      playing audio and video on the personal cognitive and/or dexterity impaired individual communication and media device;
      accepting video communications by any touching of a screen of the personal cognitive and/or dexterity impaired individual communication and media device; and
      establishing a video communication in response to any touching of the screen of the personal cognitive and/or dexterity impaired individual communication and media device;
   receiving, via a visitor communication and/or media device, a request to initiate a video communication with a cognitive and/or dexterity impaired individual on the personal cognitive and/or dexterity impaired individual communication and media device;
   playing an audible message by the personal cognitive and/or dexterity impaired individual communication and media device, indicating the request; and
   establishing a video communication between the personal cognitive and/or dexterity impaired individual communication and media device and the visitor communication and/or media device in response to any touching of the screen of the personal cognitive and/or dexterity impaired individual communication and media device.

12. The method of claim 11, wherein the cognitive and/or dexterity impaired individual is a resident of a controlled-environment facility.

13. The method of claim 12, wherein the controlled-environment facility is a skilled nursing and/or rehabilitation facility.

14. The method of claim 11, wherein the audible message is an instruction to the cognitive and/or dexterity impaired individual to touch the screen of the personal cognitive and/or dexterity impaired individual communication and media device to accept the video communication.

15. The method of claim 14, wherein the audible message is provided by the visitor, via the visitor communication and/or media device.

16. The method of claim 11, further comprising presenting a text message on the personal cognitive and/or dexterity impaired individual communication and media device indicating the request.

17. The method of claim 16, wherein the text message identifies the visitor.

18. The method of claim 11, further comprising presenting an image or video of the visitor on the screen concurrent with playing the audible message indicating the request.

19. The method of claim 11, wherein the cognitive and/or dexterity impaired individual is a resident of a controlled-environment facility, and a controlled-environment facility communications processing system accepts the request to initiate the video communication, directs the audible message indicating the request to the personal cognitive and/or dexterity impaired individual communication and media device, and establishes the video communication in response to any touching of the screen of the personal cognitive and/or dexterity impaired individual communication and media device.

20. A tangible non-transitory computer-readable storage medium having program instructions stored thereon that, upon execution by a personal cognitive and/or dexterity impaired individual communication and media device, cause the device to:
- limit functionality of the personal cognitive and/or dexterity impaired individual communication and media device available to a cognitive and/or dexterity impaired individual to:
  - play audio and video messages;
  - accept video communications by any touching of a screen of the personal cognitive and/or dexterity impaired individual communication and media device; and
  - establish a video communication in response to any touching of the screen of the personal cognitive and/or dexterity impaired individual communication and media device;
- receive a request to initiate a video communication with a cognitive and/or dexterity impaired individual on the personal cognitive and/or dexterity impaired individual communication and media device from a visitor communication and/or media device;
- play an audible message by the personal cognitive and/or dexterity impaired individual communication and media device, indicating the request; and
- establish a video communication between the personal cognitive and/or dexterity impaired individual communication and media device and the visitor communication and/or media device in response to any touching of the screen of the personal cognitive and/or dexterity impaired individual communication and media device.

* * * * *